R. E. McKEE.
SAFETY VALVE MECHANISM AND SIGNAL FOR PNEUMATIC TIRES.
APPLICATION FILED NOV. 10, 1915.
1,250,476.
Patented Dec. 18, 1917.
2 SHEETS—SHEET 1.
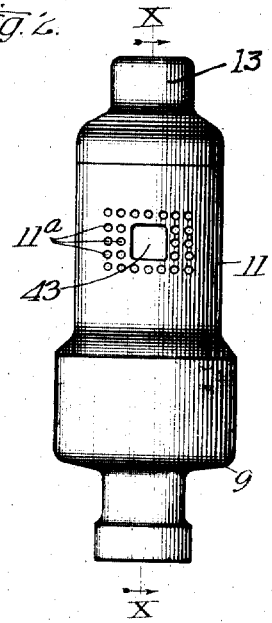
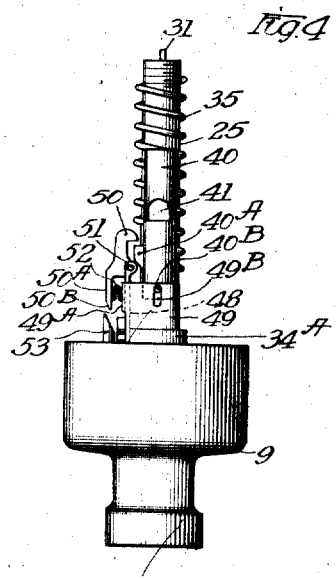
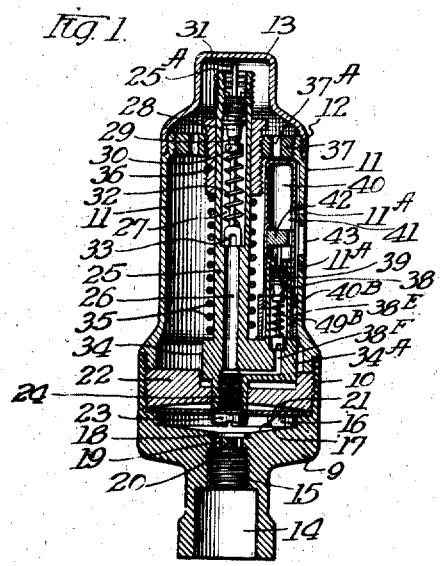
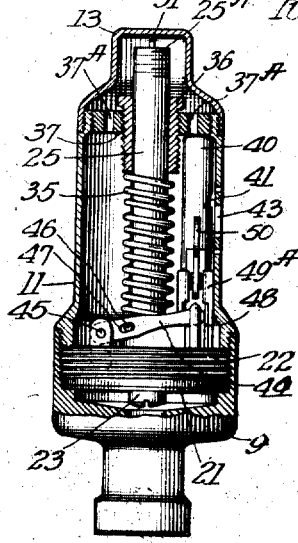

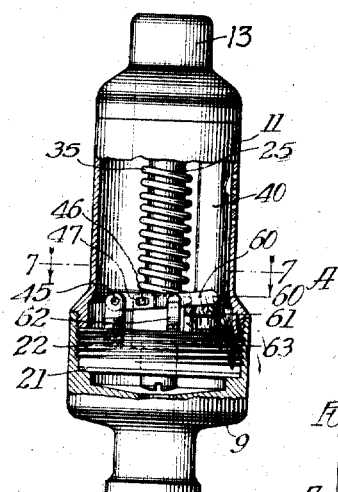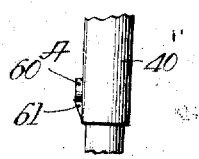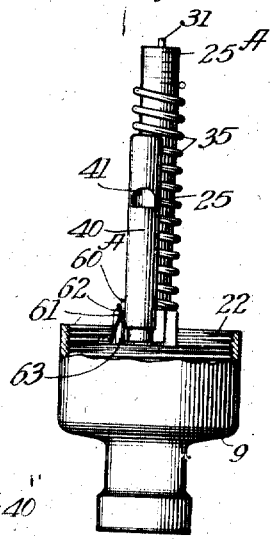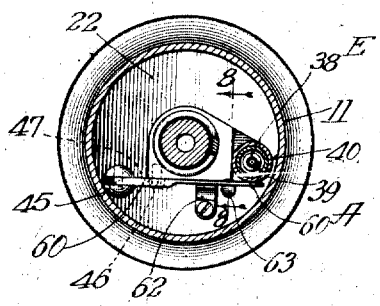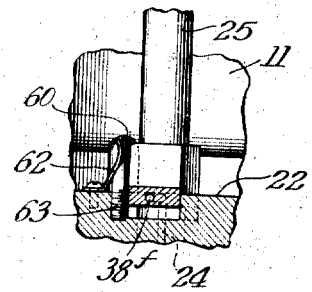

UNITED STATES PATENT OFFICE.

RAYMOND E. McKEE, OF CHICAGO, ILLINOIS, ASSIGNOR OF ONE-HALF TO OSCAR HAMMERSMITH, OF CHICAGO, ILLINOIS.

SAFETY-VALVE MECHANISM AND SIGNAL FOR PNEUMATIC TIRES.

1,250,476.  Specification of Letters Patent.  Patented Dec. 18, 1917.

Application filed November 10, 1915. Serial No. 60,659.

*To all whom it may concern:*

Be it known that I, RAYMOND E. MCKEE, of Chicago, in the county of Cook and State of Illinois, have invented certain new and useful Improvements in a Combined Safety-Valve Mechanism and Signal for Pneumatic Tires, of which the following is a specification.

This invention relates to safety-valves and more particularly to safety-valves and signals for pneumatic tires and the like, and has among its objects the production of a combined safety-valve and low pressure signal which will prolong the life of pneumatic tires and prevent what is commonly termed, "blow-outs".

Two principal causes underlie the blowing up of pneumatic tires: first, under-inflation, and second, over-inflation.

When an automobile is run with tires under inflated the sides of the tire are subjected to a greater bending motion, which has a tendency of gradually weakening and breaking the fibers in the material and thereby producing a weakened tire which easily bursts when the air pressure is increased therein.

Also, an over-inflated tire may burst when the air in the tire is sufficiently heated to an excessive air pressure for a weakened portion in the tire.

The principal object of this invention resides in the provision of a safety-valve and signal for pneumatic tires which will automatically exhaust or relieve the pressure in the tire when the pressure has been raised above a pre-determined point, and which will also whistle as a signal and warning when the pressure in the tire is lowered below a certain desired low pressure.

With the above and other objects in view, the invention consists in the details of construction and in the arrangement and combination of parts hereinafter described and particularly pointed out in the appended claims.

In describing the invention in detail, reference will be had to the accompanying drawings, wherein like reference characters denote corresponding parts in the several views, and in which—

Figure 1 is a vertical section of my invention taken on line X—X of Fig. 2.

Fig. 2 is an exterior elevation of my device.

Fig. 3 is a view corresponding to Fig. 1, but showing the principal interior members in elevation.

Fig. 4 is an elevation of the whistle and operating members.

Fig. 5 illustrates a part interior view of a modified whistle operating lever; and Fig. 6 a front elevation of the whistle.

Fig. 7 is an enlarged section on line 7—7 of Fig. 5; and Fig. 8 is an enlarged detail view taken on line 8—8 of Fig. 7.

Fig. 9 is an enlarged detail of a side view of the beveled pin on the whistle cap.

Referring to the drawings, my device consists of a lower body member having a threaded connection 10 with a cylindrical wall member 11 which latter also has a threaded connection 12 with the cap 13. The lower body member 9 is provided with a central bore 14 which has a portion decreased in diameter and threaded as at 15 to fit the end of a standard pneumatic tire tube (not shown), the construction of which is well understood in the art.

Above the threaded connection 15 is a diaphragm chamber 16, the floor 17 of which slopes downwardly toward the center depression 18 which depression communicates with the top of the interiorly threaded bore 15 through several holes 19, which are drilled in the web 20, to admit the air from the pneumatic tire tube orifice when the usual projecting valve stem, similar to stem 31, is depressed by being brought into engagement with the underside of the web 20. Therefore, as long as my device is attached to the tire tube, there will be constant communication between the interior of the diaphragm chamber 16 and the interior of the pneumatic tire.

The diaphragm 21 made preferably of hardened brass, is securely retained by the threaded disk 22 which is dished on the lower face to allow for movement of the diaphragm.

Centrally connected with said diaphragm 21, by means of the screw 23, is a vertically movable, tubular member 25 provided with an interior bore 26 with the upper enlarged portion 27 containing the common form of check valve 28 which comprises the valve seat 29 and the valve 30 mounted on stem 31. The valve is normally closed by means of the expansion spring 32 which is confined between the valve 30 and the metal rest or shoulder 33 As is well understood, the stem 31 projects normally a little above the orifice or terminal 25^A. The screw 23 is provided with a longitudinal bore 24 to afford constant communication between the interior of the pneumatic tire and the bore 26.

An enlarged portion 34 located on the exterior lower part of the tubular member 25 forms a seat for a coiled spring 35, the upper end of which abuts against the adjusting thumb screw 36 which has a screwed connection within the disk 37 which disk is screw-connected within the upper part of the cylindrical member 11.

The adjusting thumb screw 36 is provided with a central bore to fit and guide the tubular member 25 in its vertical movement, and is so arranged that by turning the screw 36 in or out, the spring 35 is more or less compressed and the pressure of the valve member 25 on the diaphragm 21 is varied, thereby affording a variable point of exhaust for the valve 30.

The illustrations show the device in a condition with just enough air pressure within the diaphragm chamber and with the stem 31 a short distance from the inside of the top of cap 13. It is obvious, that when the pressure within the tire and diaphragm chamber exceeds a certain predetermined point of safety, which is controlled by said adjusting screw 36 and spring 35, the pressure against the diaphragm 21 will continue to raise the tubular valve member 25 until the valve stem 31 engages the under side of the cap 13 and thereby displaces the valve 30 to relieve the tire of the excessive pressure and exhaust same through the openings 37^A in disk 37 and out through the perforations 11^A in the wall 11.

The part 34 is formed with an extending portion 34^A which supports the valve 38, of similar construction as the valve 30, and which valve 38 is carried in the tube 39 over which is placed the cylindrical cap 40 provided with the diaphragm 42 and opening 41 forming a whistle signal.

This whistle signal is operated by means of a lever 44 pivotally mounted at one end thereof in the support 45 which support is mounted on disk 22.

A pin 46 is secured within the collar 34 and extends through the slot 47 of the lever 44.

The other end of the lever 44 is pivotally connected with a vertically movable flat bar 48 which is guided partly in the disk 22 and also by a pair of bent edges 49^A of the vertically extended collar 49 which guides or confines the lower part of the cap 40.

A hook 50 is pivotally mounted at 51 on the upper part of bar 48. A bent flat spring 52 is securely retained between the extension 50^A and the supporting bar 48 to retain the hook normally in operative position.

A beveled pin 53, mounted on top of disk 22, is arranged to engage the beveled end 50^B and thereby release the hook 50 from engagement with the cap lug 40^A by gradually fending the lever end 50^A inwardly against the spring 52 as the valve travels downwardly. The whistle cap 40 is provided with a guide pin 40^B which moves within the slot 49^B and keeps the cap 40 from turning about its vertical axis.

It will be understood that the under-inflation whistle signal will operate when for any reason the pressure within the tire decreases so as to lower the tubular valve member 25 and the adjacent whistle valve 38.

The construction in operation is such that, while both the whistle valve 38 and cap 40 are drawn downwardly as the pressure decreases, the whistle cap travels at a greater speed than the valve within the adjacent tubular member which supports it on the extended collar. The increased speed of the cap is caused by the relative point or points of contact of the cap and the tubular member with the operating lever 44; that is, the distance from the end of lever 44, from which it engages the cap 40 and moves same through the medium of the hook 50, to the pivot 45 is greater than the distance from the pin 46 to the pivot 45. It is obvious that the end of lever 44 travels through a longer arc in the same time than the distance through which the pin 46 on the tubular member travels. In the downward movement of the cap 40 the diaphragm 42 within will engage the stem of valve 38 and will continue to gradually depress same against the pressure of its coiled spring 38^E to exhaust the air through the openings 43 and 41 to sound the whistle alarm until the beveled end 50^B of the extension 50^A is depressed by the pin 53 to release the cap from the hook 50 and thereby close valve 38.

In the modified form of construction illustrated by Figs. 5 to 8 inclusive, the construction and operation of the exhaust valve and under-inflation signal is similar to that above described and shown by Figs. 1 to 4, the particular modification residing in the lever for operating the whistle cap which may be described as follows:

The lever 60, pivotally mounted at 45, engages the pin 46 within the slot 47 and is decreased in thickness (see Fig. 7) from a point near this slot 47 to the extreme operating end of the lever thereby affording a lateral spring action to this thinner portion 60^A.

Normally, the end portion 60ᴬ rests against the cap 40 a slight distance above the flat pin 61 which is rigidly secured to the bottom of the cap 40.

The spring action of this lever tends to keep the end 60ᴬ against the cap 40 but to positively retain same in this position, a flat bent spring 62 secured to disk 22 may be provided on the other side to bear against it when the lever is in the very upper position. This will positively retain the lever end 60ᴬ above pin 61 as it draws the cap 40 downwardly until released by the beveled pin 63 which deflects the end 60ᴬ away from the cap 40 and pin 61 thereby permitting the pressure of the air and coil spring within the valve, to raise the cap and close the valve.

It is obvious then, that it is impossible for the signal to continue whistling so as to entirely exhaust the tire. The duration of the whistle signal can be varied by raising or lowering the pivotal support 45 and the beveled pin 63, both having a screw connection in disk 22.

It is thought that the illustrations and foregoing description of construction and operation will be clearly understood, therefore, a more extended explanation is omitted.

I claim as my invention:

1. In a valve mechanism of the kind described, the combination of a valve body, a spring influenced valve member movably mounted within said body, a combined inlet and outlet valve within said valve member arranged to exhaust at a predetermined high pressure, and a whistle arranged to signal when the pressure is lowered to a predetermined point.

2. In a valve mechanism of the kind described, the combination of a valve body, a vertically movable tubular valve member, a combined inlet and outlet valve within said member, a diaphragm having its center in engagement with said member, a second valve arranged to sound a whistle signal, means for exhausting through said valve in said tubular member at a predetermined high pressure, and means operated by said tubular member for exhausting said second valve to sound the whistle signal at predetermined low pressure.

3. In a valve mechanism of the kind described, the combination of a valve body, a movable valve member, a combined inlet and outlet valve within said member, a diaphragm having its center in engagement with said valve member, a second valve communicating with a whistle signal, means for exhausting through said valve within said member when said member is raised to a predetermined high point by said diaphragm, and independent means for operating said whistle valve when said member is lowered to a predetermined point.

4. In a valve mechanism of the kind described, the combination of a valve body, a vertically movable valve member, an air inlet valve within said member, a diaphragm having its margin restrained and its central portion constantly engaging said member to raise and lower said member under the influence of air pressure beneath said diaphragm, a second valve communicating with the interior of said member and with a whistle signal, means within the path of said valve in said member arranged to exhaust said valve at a predetermined high pressure, and independent means for operating said second valve to sound a whistle signal at a predetermined low pressure.

5. In a valve mechanism of the kind described, the combination with a valve body adapted for connection with a pneumatic tire, of a movable tubular valve member, a valve within said valve member arranged to fill and exhaust the tire, a diaphragm having its margin restrained and its central portion engaging said valve member, a spring exerting pressure against one side of said diaphragm, adjustable means for varying the pressure of said spring, means arranged to automatically exhaust said valve at a predetermined high pressure, and a second valve communicating with said tubular valve member and means for operating said second valve to sound a whistle signal when the pressure is lowered to a predetermined low pressure.

6. In a valve mechanism of the kind described, the combination with a valve body adapted for connection with a pneumatic tire, of a movable valve member; a valve within said valve member for filling and exhausting said tire; a diaphragm having its margin restrained and its central portion engaging said valve member; a spring and an adjusting screw for varying the pressure against one side of said diaphragm; means for automatically exhausting said valve in said member at a predetermined high pressure; a low pressure whistle signal comprising a whistle, a valve, a spring normally retaining said valve in closed position, and a mechanism controlled by said valve member for operating said low pressure whistle valve.

7. In a valve mechanism of the kind described, the combination of a valve body, a movable valve member within said body, a flexible diaphragm having its margin restrained and its central portion supporting said movable valve member, an air inlet valve within said movable member, a second valve communicating with said movable member, a whistle cap member associated with said second valve, a spring exerting pressure against one side of said diaphragm, adjustable means for varying the pressure of said spring, stationary means for exhausting said air inlet valve when the valve member is raised to a predetermined point, and independent means controlled by said valve member for operating said whistle cap member when said valve member is lowered to a predetermined point, comprising a pivotally mounted flexible lever adapted to move said whistle member downwardly to open said second valve, and means for deflecting the end of said flexible lever to release said cap and thereby permit said second valve to close.

In witness whereof, I have hereunto subscribed my name this 2nd day of November, 1915.

RAYMOND E. McKEE.